United States Patent
Morris (10) Patent No.: US 7,916,717 B2
(45) Date of Patent: Mar. 29, 2011

(54) AUTOMATED GATEWAY ROUTING, INCOMING AND OUTGOING

(75) Inventor: Stuart Morris, South Plainfield, NJ (US)

(73) Assignee: Glowpoint, Inc., Hillside, NJ (US)

( * ) Notice: Subject to any disclaimer, the term of this patent is extended or adjusted under 35 U.S.C. 154(b) by 1324 days.

(21) Appl. No.: 11/045,489

(22) Filed: Jan. 31, 2005

(65) Prior Publication Data

US 2005/0180400 A1    Aug. 18, 2005

Related U.S. Application Data

(60) Provisional application No. 60/540,009, filed on Jan. 30, 2004.

(51) Int. Cl.
*H04L 12/66* (2006.01)

(52) U.S. Cl. .................. 370/354; 370/401; 725/109

(58) Field of Classification Search ........... 370/352–356
See application file for complete search history.

(56) References Cited

U.S. PATENT DOCUMENTS

| | | | | |
|---|---|---|---|---|
| 5,960,340 A * | 9/1999 | Fuentes | | 455/417 |
| 6,006,253 A * | 12/1999 | Kumar et al. | | 709/204 |
| 6,373,857 B1 * | 4/2002 | Ma | | 370/475 |
| 6,374,302 B1 * | 4/2002 | Galasso et al. | | 709/238 |
| 6,584,093 B1 * | 6/2003 | Salama et al. | | 370/351 |
| 6,600,735 B1 * | 7/2003 | Iwama et al. | | 370/352 |
| 6,636,508 B1 * | 10/2003 | Li et al. | | 370/389 |
| 6,657,975 B1 * | 12/2003 | Baxley et al. | | 370/260 |
| 7,130,273 B2 * | 10/2006 | Baj | | 370/242 |
| 7,154,883 B2 * | 12/2006 | Hirayama et al. | | 370/356 |
| 7,239,629 B1 * | 7/2007 | Olshansky et al. | | 370/353 |
| 2002/0199203 A1 * | 12/2002 | Duffy et al. | | 725/109 |
| 2003/0028535 A1 * | 2/2003 | Sheldon et al. | | 707/10 |

* cited by examiner

*Primary Examiner* — Simon Sing (74) *Attorney, Agent, or Firm* — Morrison & Foerster LLP (57) ABSTRACT

A method and system for establishing a videoconference between a first network endpoint and a second network endpoint. The method and system including, inputting a plurality of numbers into the first network endpoint, wherein, the first network endpoint is an IP based network endpoint, the plurality of numbers are in a standard telephone format, and the plurality of numbers are associated with the second network endpoint. Then communicating the input numbers to a first network gatekeeper having a call forwarding table, wherein the input numbers are manipulated based on processing parameters, identifying a gateway based on the manipulated numbers, establishing a connection with the identified gateway, establishing a connection between the identified gateway and a second network gatekeeper, establishing a connection between the second network gatekeeper and the second endpoint, and transferring videoconferencing data between the first network endpoint and the second network endpoint through the established connections.

15 Claims, 6 Drawing Sheets

AUTOMATED GATEWAY ROUTING, INCOMING AND OUTGOING

RELATED APPLICATION

This application claims the priority of previously filed U.S. Provisional Patent Application No. 60/540,009 filed on Jan. 30, 2004 which is herein incorporated in its entirety by reference.

FIELD OF THE INVENTION

The invention relates to the field of videoconferencing.

BACKGROUND OF THE INVENTION

In today's global economy it is often logistically impossible for parties to meet fac& to face for even business critical meetings. However, the benefits of such meetings are as important as ever. With innumerable companies vying for each other's business, the personal relationships built through face to face meetings are often a critical factor in maintaining and growing a company's business. Over the last several years, videoconferencing technologies have been utilized to solve this dilemma. By using videoconferencing, companies are able to maintain visual relationships with clients while minimizing costs and lost time that are often associated with travel.

In conventional videoconferencing systems, the majority of videoconferencing components (including codec's, gatekeepers, gateways, and mcu's) operate under two umbrella recommendations of the International Telecommunications Union (ITU-T). The first recommendation, H.323, specifies the complete architecture and operation of real-time multimedia communications over packet networks, while the second, H.320, specifies real-time multimedia communications over circuit switched networks (ISDN). In an H.320 environment, end-users initiating a videoconference call typically dial a 10-digit number similar to dialing a telephone call. However, when initiating a videoconference call on an H.323 network, the end user is required to use IP (Internet Protocol) addresses.

While ISDN networks allow users to initiate videoconferences with relative ease, these systems are very limited in their functionality. In contrast to the ISDN networks, IP based video conferencing networks are able to provide almost unlimited additional features. Examples of such features might be video mail systems, operator access and data streaming.

While IP networks can provide these much desired features, a major failing of the H.323 networks is that the end user initiating the call must be familiar with IP addressing. Unfortunately, most users are not comfortable using IP addressing and are therefore either unable or unwilling to adopt videoconferencing as a day to day business tool. This inability to initiate calls using IP networks has substantially hampered the proliferation of videoconferencing.

Figure 1:
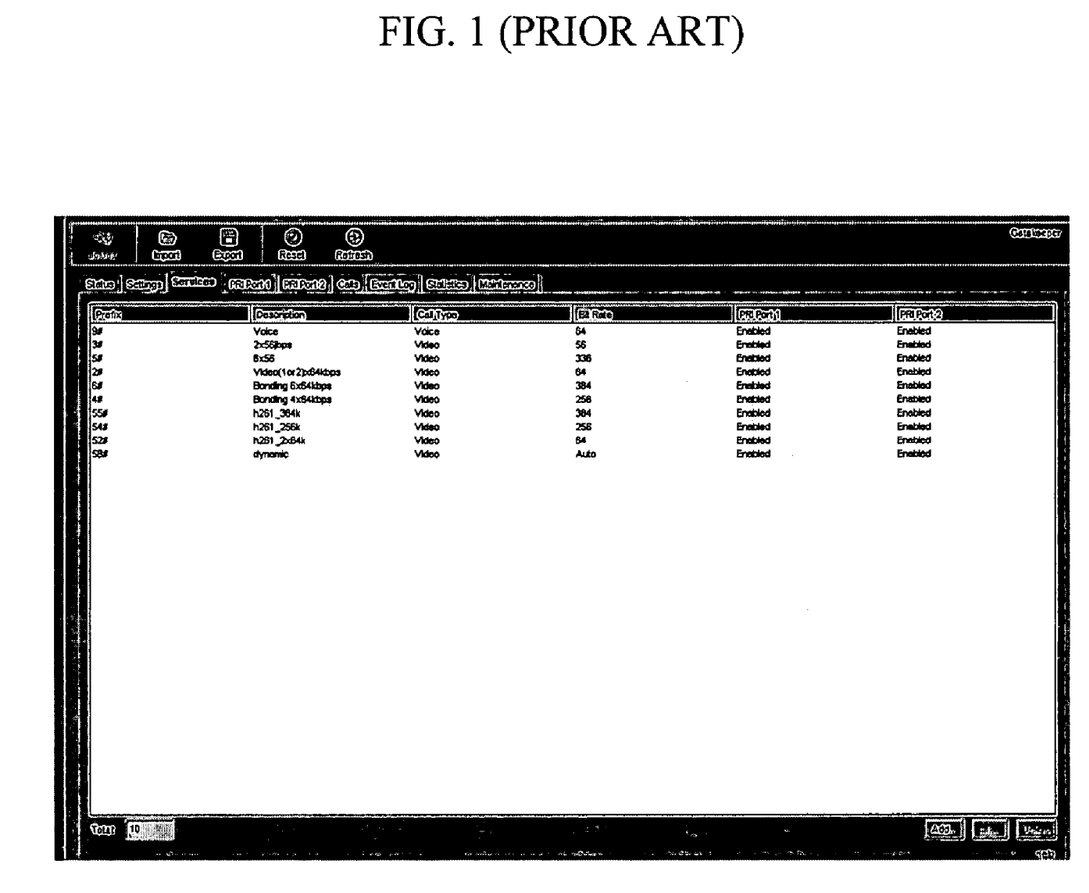
FIG. 1 shows an example of a gateway prefix table.
Figure 2:
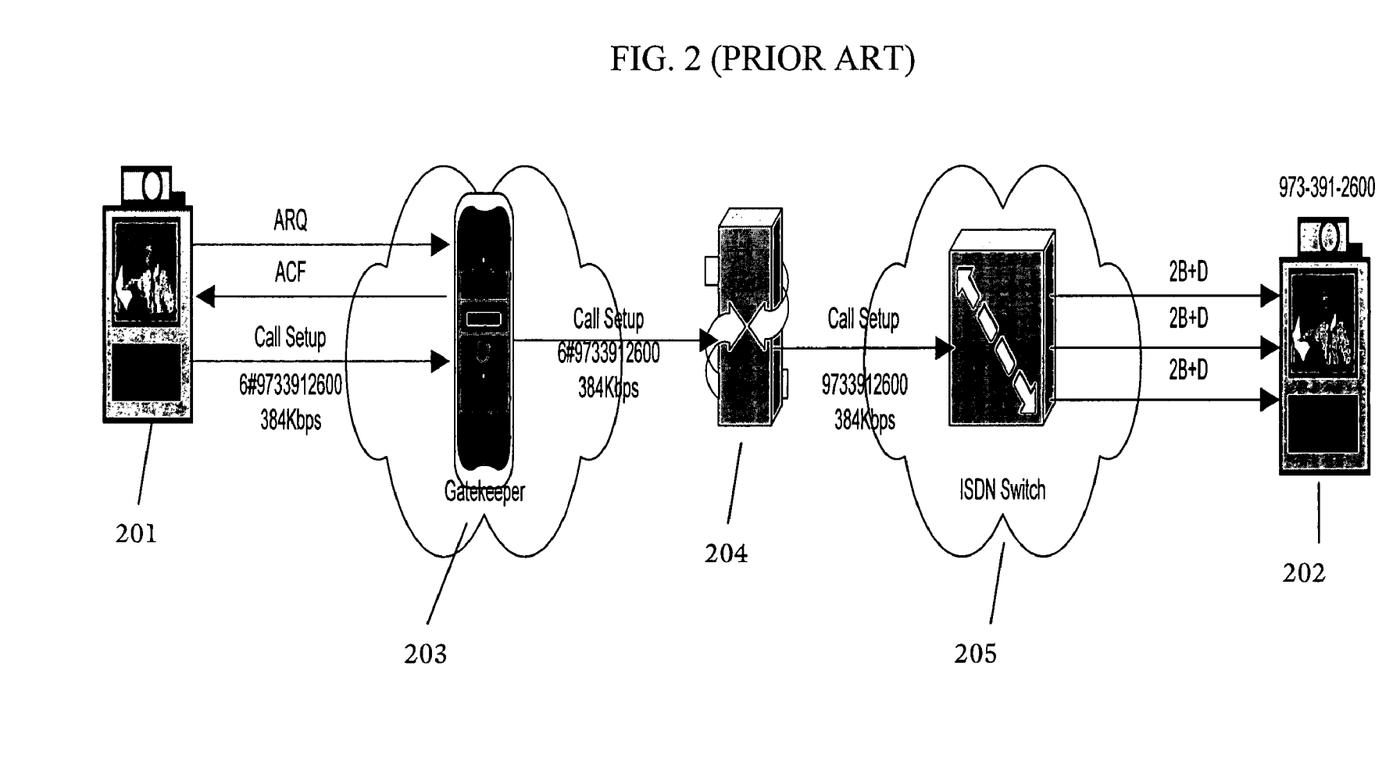
FIG. 2 shows an example of a call flow between an on network IP based endpoint and a PSDN endpoint using the call prefix table of FIG. 1.

In a previous effort to make videoconferencing more user friendly, gatekeeper technology was developed that allowed end users to initiate videoconference calls on IP networks by dialing a telephone-like number instead of entering an IP address. In addition, calls between IP and ISDN systems using added gateway devices were made possible by appending a service prefix that identified an ISDN network endpoint that was being called. In this system, end-users were required to use specific service prefixes which determined the type of call and what gateway the call would be sent to. Once the user dialed the prefix, a network gateway would reference a gateway prefix table, an example of which is shown in FIG. 1. The gateway prefix table would identify registered devices that were available to provide the service requested. When such a device was found, the gatekeeper would transfer the call setup information to that gateway. An example of a call using a gateway prefix table is shown in FIG. 2. For example, service prefix 6# could be used to define a 384 kbps bonded call with an ISDN destination endpoint within the U.S. The call would then be routed to one of a number of U.S. based gateways. Similarly, service prefix 16# could be used to define a 384 kbps bonded call to an international ISDN destination endpoint in Europe. This call would then be routed to a gateway in the U.K. While this system was technically efficient, users found it difficult to remember all of the different service prefixes and their meaning.

Also, this system required that the users input the correct service prefix for each call in order to route the call to the proper and most cost effective gateway. Users found this difficult for several reasons, for example, users often used the wrong prefix while making international calls, thereby routing the calls via domestic gateways at a substantially higher cost and causing a high degree of user dissatisfaction.

SUMMARY OF THE INVENTION

An exemplary embodiment of the invention relates to a method for establishing a videoconference between a first network endpoint and a second network endpoint, wherein a plurality of numbers are input into the first network endpoint. In this embodiment the first network endpoint is an IP based network endpoint, the plurality of numbers are in a standard telephone format, and the plurality of numbers are associated with the second network endpoint. This exemplary embodiment also involves communicating the input numbers to a first network gatekeeper having a call forwarding table, wherein the input numbers are manipulated based on processing parameters, identifying a gateway based on the manipulated numbers, establishing a connection with the identified gateway, establishing a connection between the identified gateway and a second network gatekeeper, establishing a connection between the second network gatekeeper and the second endpoint, and transferring videoconferencing data between the first network endpoint and the second network endpoint through the established connections.

In an aspect of the invention the standard telephone format is direct inward dialing.

In another aspect of the invention the standard telephone format is e.164 aliasing.

In another aspect of the invention the standard telephone format is a ten digit number proceeded by a 1.

In another aspect of the invention the second network endpoint is an ISDN based endpoint.

In another aspect of the invention the second network endpoint is an IP based endpoint.

In another aspect of the invention the first network endpoint and the second network endpoint are not on the same network.

Another exemplary embodiment of the invention involves a videoconferencing system having a first videoconferencing network of a first network type, a second videoconferencing network of a second network type, and a gateway to connect the first videoconferencing network and the second videoconferencing network. In this embodiment of the invention, at least one of the first network type or the second network type is an IP based network type, a first network endpoint of the first videoconferencing network is able to initiate a videoconference with a second network endpoint of the second videoconferencing network by dialing a number having standard telephone format.

In an aspect of the invention the number having a standard telephone format is a ten digit number.

In another aspect of the invention the number having a standard telephone format complies with e.164 aliasing.

In another aspect of the invention the number having a standard telephone format is a ten digit number proceeded by a 1.

A further aspect of the exemplary embodiment further involves a first gatekeeper associated with the first videoconferencing network, a second gatekeeper associated with the second videoconferencing network, and a gateway. In a further aspect of this embodiment of the invention, the dialed number is transmitted to the first gatekeeper, the first gatekeeper manipulates the dialed number according to processing parameters, the first gatekeeper identifies the gateway based on the manipulated number, the first gatekeeper forms a connection with the gateway, the gateway identifies the second gatekeeper based on information transmitted from the first gatekeeper, the gateway established a connection with the second gatekeeper, the second gatekeeper identifies the second network endpoint based on data received from the gateway, the second gatekeeper establishes a connection with the second network endpoint, and the first network endpoint and the second network endpoint transfer videoconferencing data through the established connections.

Another exemplary embodiment of the invention involves a system having a first videoconference network having a first network endpoint, a second videoconference network having a second network endpoint, where at least one of the first network and/or the second network are an IP-based network, and the first network and the second network are connectable by a gateway. In an aspect of this embodiment of the invention, a videoconference between the first network endpoint and the second network endpoint is initiated by dialing a number having a standard telephone format.

Another exemplary embodiment of the invention involves a system having a first videoconference network having a first network endpoint, a second videoconference network having a second network endpoint, wherein at least one of the first network and/or the second network are an IP-based network, the first network and the second network being connectable by a gateway. In an aspect of this embodiment of the invention, a videoconference between the first network endpoint and the second network endpoint is initiated by inputting, at the first endpoint, an identifier that is recognizable by a public switched telephone network as being associated with the second endpoint.

In an aspect of the invention the identifier is a ten digit number.

Another exemplary embodiment of the invention involves a method involving establishing a videoconference between a first videoconference network having a first network endpoint and a second videoconference network having a second network endpoint, wherein at least one of the first network and the second network has an IP-based network, and the first network and the second network are connectable by a gateway. In an aspect of this embodiment of the invention, the videoconference between the first network endpoint and the second network endpoint is established by inputting, at the first endpoint, an identifier that is recognizable by a public switched telephone network as being associated with the second endpoint.

DETAILED DESCRIPTION

Three exemplary embodiments of the invention will be described in detail. The invention is not limited to the preferred embodiments shown herein.

Throughout this specification networks and network components are referred to as IP based or ISDN based. IP based networks may be networks that are compliant with standards such as the H.323 standard established by the International Telecommunications Union, while the ISDN based networks may be compliant with the H.320 standards established by the same body. However, these network types are not limited to networks based on those standards as they now exist. The IP based designation is used to indicate Internet Based networks/components. The ISDN based designation is used to indicate telephone based networks/components.

FIG. 1 shows a prefix lookup table as described in the prior art.

FIG. 2 shows an example of a call flow between an IP based endpoint 201 and an ISDN based endpoint 202 using the call prefix table of FIG. 1 as known in the prior art. As shown in FIG. 2, the IP based endpoint 201 originates a gateway call to the ISDN based endpoint 202 on the Public Switched Data Network (hereinafter, "PSDN") by using a dial-string of 6#9733912600 where 6# is the gateway service prefix used to set up a 384 kbps bonded video call (6×64 kbps) to the PSDN; and 973-391-2600 is the ISDN number of the destination videoconferencing system, the ISDN based endpoint 202.

An ARQ (Admission Request) message is then sent to the gatekeeper 203 by the IP based endpoint 201; assuming IP based endpoint 201 is listed in the gatekeeper 203 with a valid registration, the gatekeeper 203 then returns an ACF (Admission Confirmed) message to the IP based endpoint 201. At this point the call setup proceeds. In this example, the call setup is performed using a Q.931 protocol.

Once the call setup has been initiated, the gatekeeper 203 determines if the prefix, in this example 6#, is a valid service prefix. If the gatekeeper 203 recognizes 6# as a valid service prefix it then determines if a registered device that provides this service is available. The gatekeeper 203 searches a gateway prefix table to determine if a device is available. If the service is associated with a gateway, as is assumed in this example, an available gateway 204 is identified and the gatekeeper 203 then forwards all call setup information to the gateway 204.

Once the gateway 204 receives the call setup information from the gatekeeper 203 it establishes a 6×64 kbps (384k) bonded call to the ISDN based endpoint 202. Once all the channels connect, the gateway 204 negotiates media capabilities between the IP based endpoint 201 and the ISDN based endpoint 202. If the gateway 204 is successful, the call forms and the videoconference is started.

As previously discussed, the above system for establishing a videoconference is limited due to the use of the appended service prefix. Users are greatly inconvenienced by the need to know the correct service prefix for every call that is initiated.

To solve this deficiency in the prior art, the invention does not require a user to use a service prefix. Instead the user only needs to know the telephone number that is assigned to the endpoint that they are trying to connect to. While the number used in the following examples is a standard ten digit telephone number, the invention is not limited to such embodiments. The invention can be configured to accept any format currently available or to be developed in the future.

One embodiment of the invention allows a user to dial, or otherwise input, the telephone number of the endpoint that they wish to establish a videoconference with. Once the number is input, the user's endpoint contacts a gatekeeper with which it is associated. The gatekeeper then manipulates the number that was input. In one embodiment of the invention, the gatekeeper manipulates the number by first comparing the number to a wildcard forwarding table. The wildcard forwarding table then manipulates the number according to predefined criteria. The manipulated number is then used to contact a second gateway (or a parent gatekeeper as detailed below) which is associated with the desired endpoint. The second gateway then establishes a connection with the desired endpoint and the video conference is initiated. In contrast to the prior art, the invention does not require a user to input a service prefix. Instead, the invention manipulates the input number and forms the video conference based on processing parameters in the gatekeepers in a way that is transparent to the user. As such, the invention is much more user friendly than previous methods and apparatuses for establishing videoconferences.

Various embodiments of the invention manipulate the input number differently depending on the type of endpoint being contacted and the location of the endpoint. Three general examples will be shown in which the endpoint being contacted is an IP based endpoint on the same network, a domestically located ISDN based endpoint, and an internationally located ISDN based endpoint.

Figure 4:
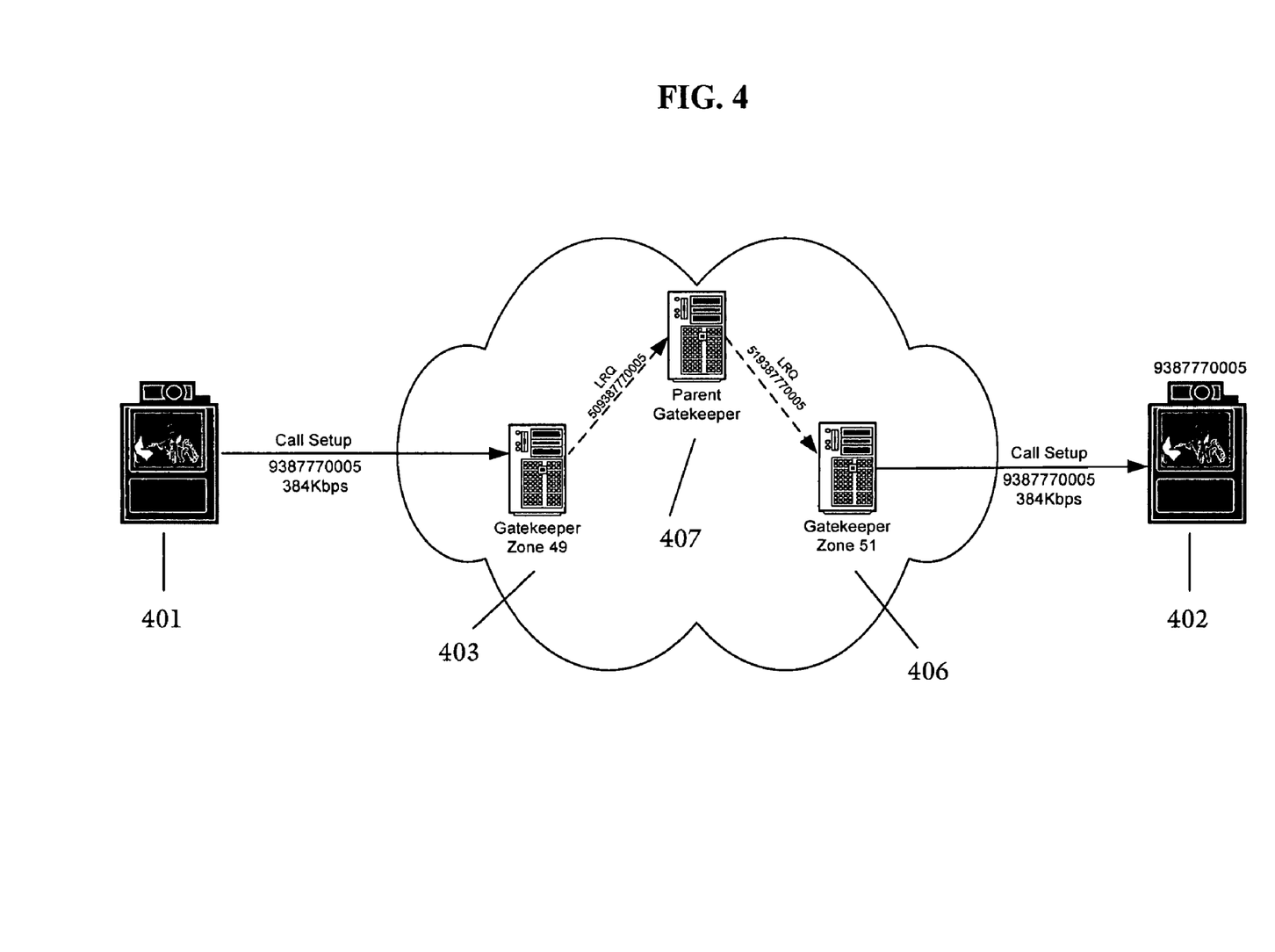
FIG. 4 shows an example of a call flow between IP based endpoints on the same network according to an aspect of the present invention.

FIG. 4 depicts an illustrative embodiment where a user establishes a videoconference with an IP based endpoint on the same network. FIG. 4 depicts the call flow according to an exemplary embodiment. In this example, a user at an IP based endpoint 401 wishes to call a second IP based endpoint 402, wherein the first endpoint 401 and the second endpoint 402 are part of the same network but are associated with different gatekeeper zones, herein labeled zone 49 and zone 51. Again, in contrast to the prior art, the user only needs to input a number which is assigned to the endpoint to be contacted.

Figure 3:
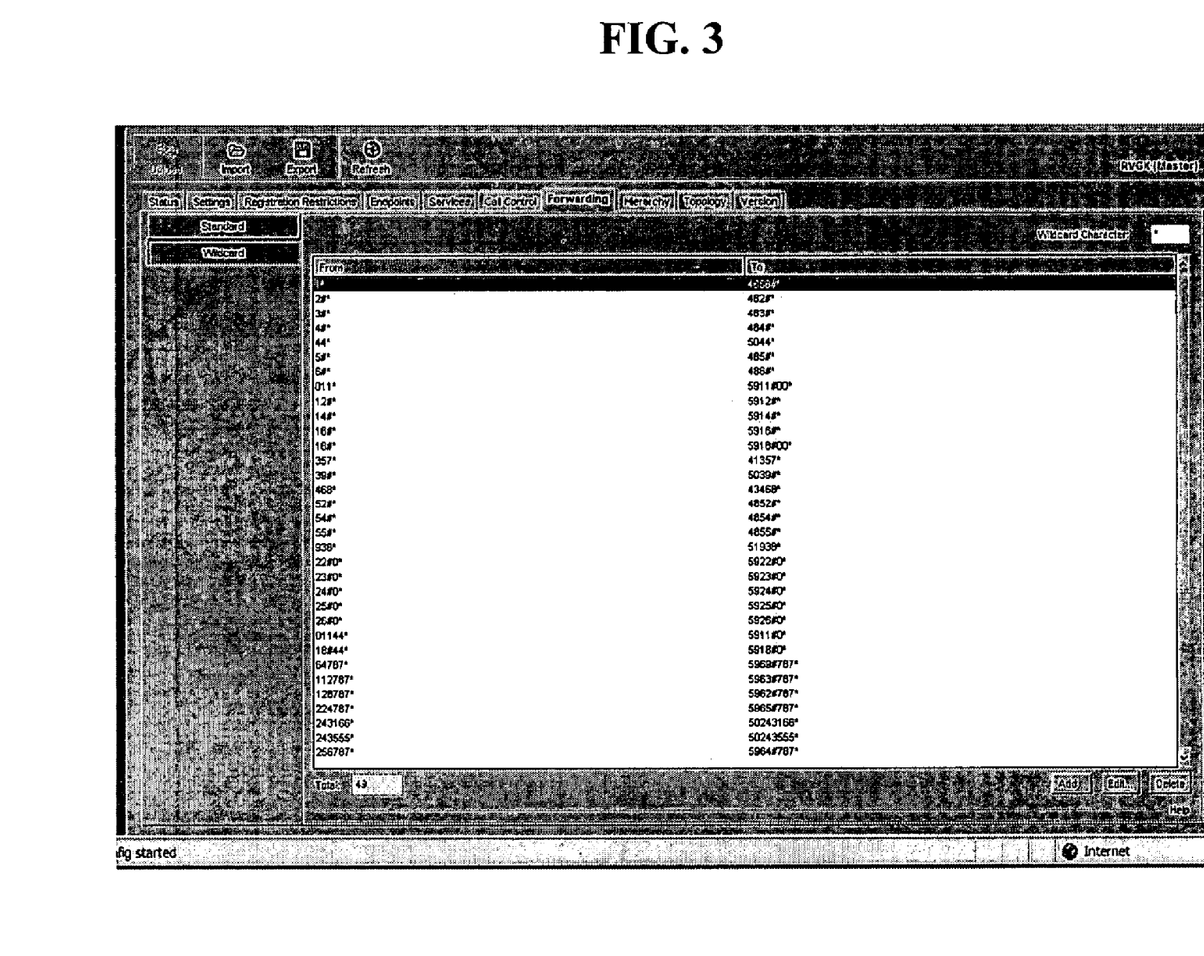
FIG. 3 shows an example of a forwarding table according to an aspect of the present invention.

In the exemplary embodiment shown, the user inputs the ten digit number, 9387770005, at the first endpoint 401 to contact the endpoint 402. The first endpoint 401 then transmits a call setup message including the input number to the first gatekeeper 403. The first gatekeeper 403 searches its Wildcard Forwarding table (an illustrative example of which is shown in FIG. 3) to locate a rule for numbers beginning with 938 (in this example 938*->51938* as shown in FIG. 3). In this example, the rule defines when a dialed number string begins with 938, the number 51 should be appended to the beginning of the dial-string. Therefore, the original destination number 9387770005 is changed to 519387770005 where 51 indicates the Zone Prefix of the second gatekeeper 406 which is associated with the second endpoint 402. The second gatekeeper 406 then continues call processing and setup.

In this embodiment, the first gatekeeper 403 then proceeds to search its own registration table to find a match for 519387770005. If no match is found (as is the case in this example) the first gateway 403 then sends a Location Request (LRQ) message to its parent gatekeeper 407. The parent gatekeeper 407 then searches its child gatekeeper table for a matching entry. In this embodiment, the parent gatekeeper 407 and finds a match for the appended zone prefix and transmits an LRQ to the second gatekeeper 406 located in the associated zone.

The second gatekeeper 406 then receives and acknowledges LRQ from the parent gatekeeper 407 and manipulates the appended zone prefix. The second gatekeeper 406 then searches its registration table for a match to the input number, 9387770005. If a match is located, the second gatekeeper 406 sends a Location Confirm message (LCF) back to the first gatekeeper 403 and proceeds to connect the video call between the first endpoint 401 and the second endpoint 402.

Figure 5:
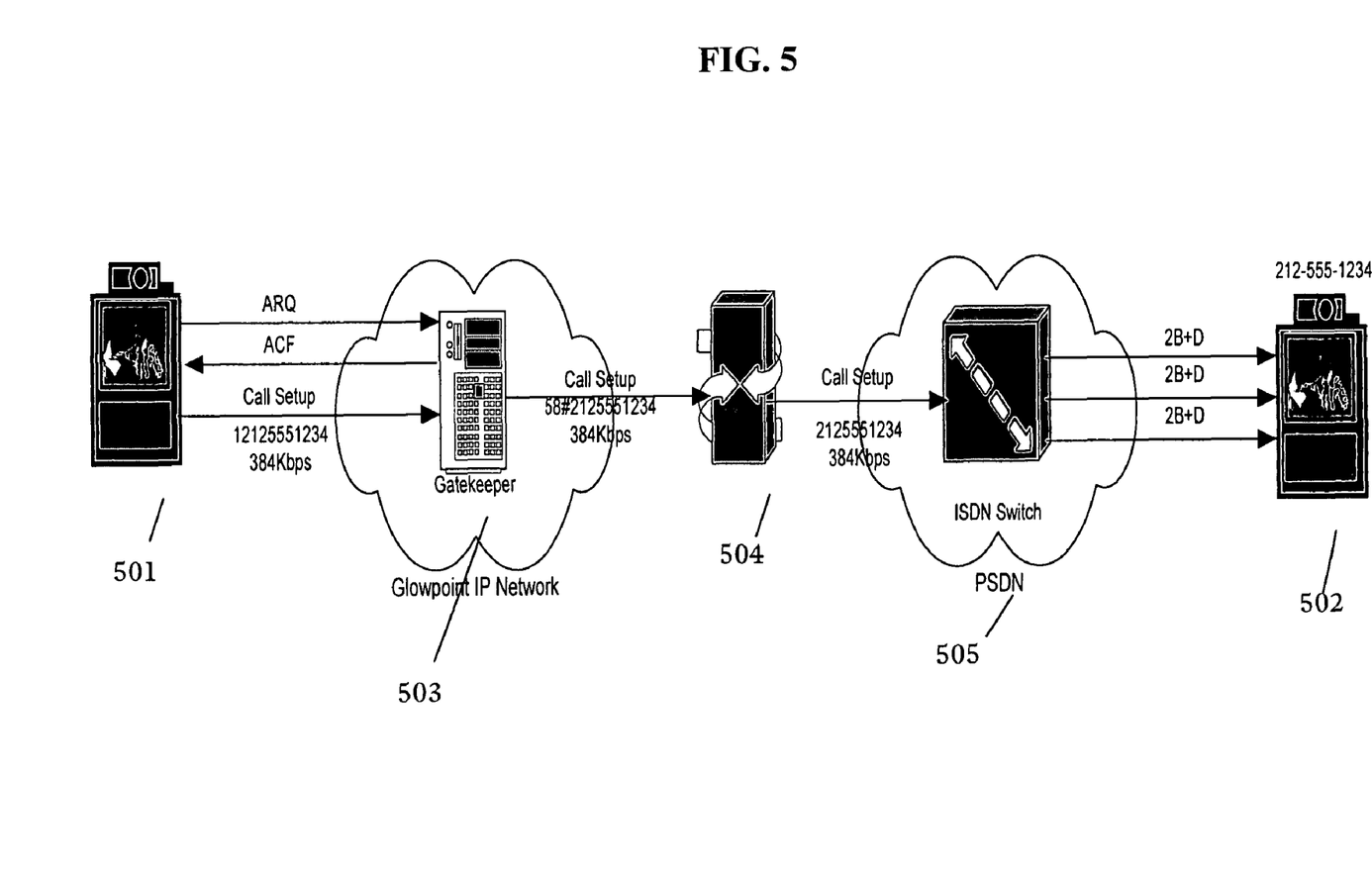
FIG. 5 shows an example of a call flow between an IP based endpoint and a domestic ISDN based endpoint using a call forwarding table according to an aspect of the present invention.

FIG. 5 shows an illustrative embodiment of the invention in which a user at a first IP based endpoint establishes a videoconference with a second ISDN based endpoint which is located domestically.

In this embodiment, a user initiates a videoconference call from a first IP based endpoint 501. While the call is depicted as a 384 kbps gateway call, the connection speed is not a critical factor, various embodiments can use any of a plurality of different connection speeds. In this example the videoconference call is initiated by dialing 12125551234. Again, while a standard telephone number is used in this example, the invention is not dependant on the standard used.

When the number is dialed, the first endpoint 501 transmits an ARQ to the gatekeeper 503; the gatekeeper 503 confirms that the first endpoint 501 is registered and returns an ACF to the first endpoint 501 and the call proceeds. The gatekeeper 503 receives signaling data from the first endpoint 501 which includes the input number, 12125551234. In this example the signaling data is in a Q.931 format, however, the format of the data is not critical to the practice of the invention.

The gatekeeper 503 then checks its Wildcard Forwarding Table (an example of which is shown in FIG. 3) for a rule that matches the input number. If a matching rule is located, the input number is then manipulated. In this example the gatekeeper 503 locates a rule for input numbers beginning with 1 instructing the gatekeeper 503 to manipulate the number as follows: 12125551234->58#2125551234 where 58# is a service prefix for a dynamic mode gateway call. Once the service prefix is appended to the input number, the call is processed in the fashion described above with respect to the prior art.

Figure 6:
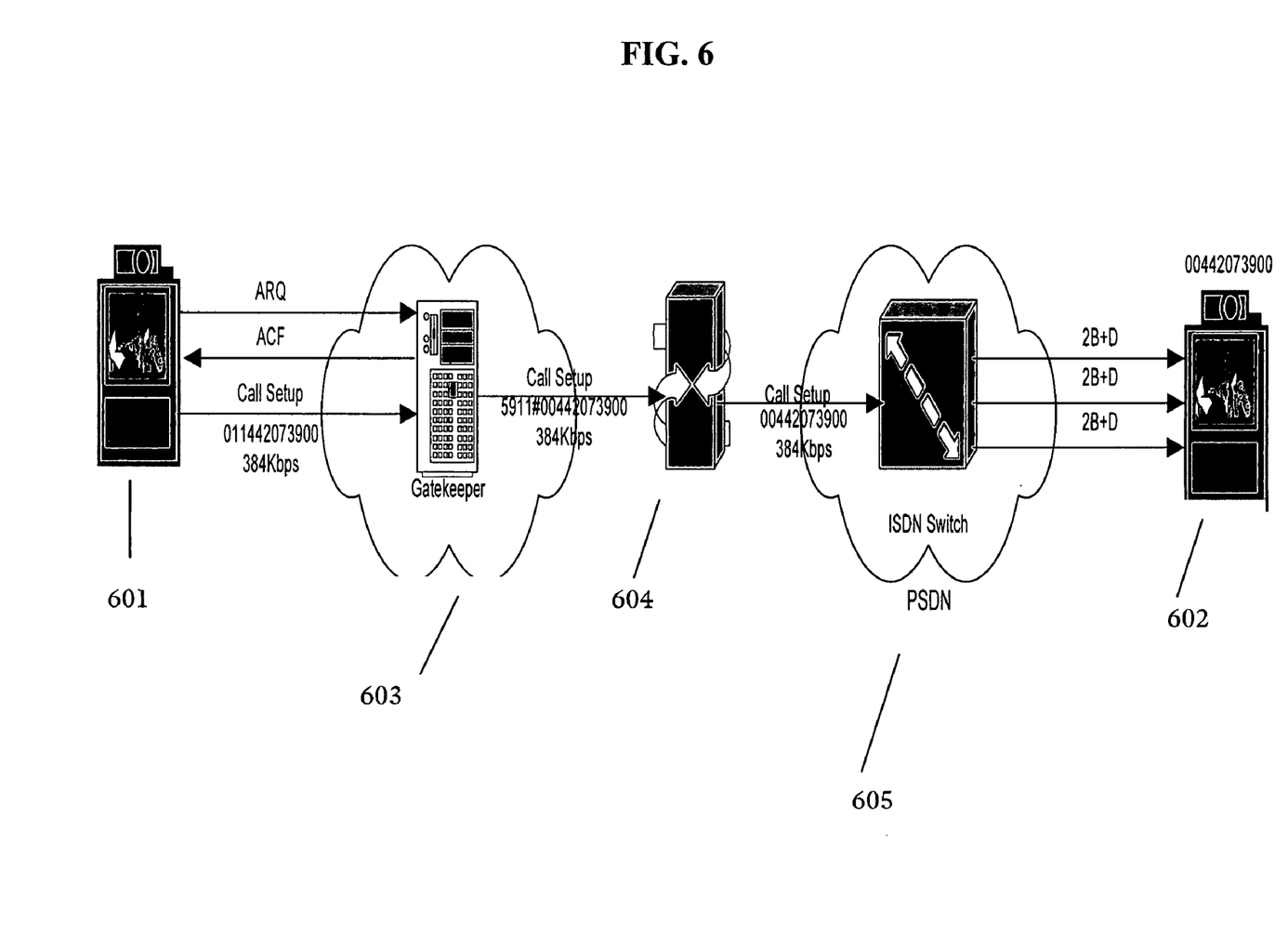
FIG. 6 shows an example of a call flow between an IP based endpoint and an international ISDN based endpoint using a call forwarding table according to an aspect of the present invention.

FIG. 6 an example of a call flow between an IP based endpoint and an international ISDN based endpoint using a call forwarding table according to an aspect of the present invention. In this illustrative embodiment a user initiates a videoconference call from a first IP based endpoint 601 to a second ISDN based endpoint 602 which is located in the UK. Once again, while this example depicts a connection speed of 384 kbps, the speed is not critical to the practice of the invention. In this example, the user initiates the call by inputting the number 011 44 207 3900. Again, while a standard e.164 compliant telephone number is shown in this example, the practice of the invention does not depend on the standard used.

In this embodiment, the first endpoint 601 transmits an ARQ to the gatekeeper 503; the gatekeeper 603 then confirms that the first endpoint 601 is registered and returns an ACF to the first endpoint 601 and the call proceeds. The gatekeeper 601 receives signaling data including the dialed number, in this case 011 44 207 3900 from the first endpoint 601. The gatekeeper 601 then checks its Wildcard Forwarding Table (shown in FIG. 3) for a rule that matches the dialed number. In this example, the gatekeeper 601 locates a rule for input numbers beginning with 011 an manipulates the input number as follows: 011472073900->5911#00442073900 where 5911# is a service prefix for a dynamic mode international gateway call. Once the number is manipulated, the call proceeds as shown above with respect to the prior art.

I claim:

1. A method for establishing a videoconference between a first network endpoint and a second network endpoint, comprising:
    inputting a plurality of numbers into the first network endpoint, wherein,
        the first network endpoint is an IP based network endpoint,
        the plurality of numbers are in a standard telephone number format, and
        the plurality of numbers are associated with the second network endpoint,
    communicating the input numbers to a network gatekeeper having a call forwarding table,
    determining a prefix corresponding to a portion of the plurality of numbers using the call forwarding table,
    adding the prefix to the plurality of numbers,
    identifying a gateway based on the prefix,
    establishing a connection with the identified gateway,
    establishing a connection between the identified gateway and a switch,
    establishing a connection between the switch and the second endpoint, and
    transferring videoconferencing data between the first network endpoint and the second network endpoint through the established connections.

2. The method according to claim 1, wherein the standard telephone number format is based on direct inward dialing.

3. The method according to claim 1, wherein the standard telephone number format is based on e.164 aliasing.

4. The method according to claim 1, wherein the standard telephone number format is a ten digit number proceeded by a 1.

5. The method according to claim 1, wherein the second network endpoint is an ISDN based endpoint.

6. The method according to claim 1, wherein the first network endpoint and the second network endpoint are not on the same network.

7. A videoconferencing system comprising:
    an IP based videoconferencing network comprising a gatekeeper having a call forwarding table,
    a second videoconferencing network of a second network type, and
    a gateway to connect the IP based videoconferencing network and the second videoconferencing network,
    wherein a first network endpoint of the IP based videoconferencing network is able to initiate a videoconference with a second network endpoint of the second videoconferencing network by dialing a number having standard telephone number format, and
    the gatekeeper is configured to determine a prefix corresponding to the number using the call forwarding table, add the prefix to the number, and identify the gateway based on the prefix.

8. The system of claim 7, wherein the number having a standard telephone number format comprises a ten digit number.

9. The system of claim 7, wherein the number having a standard telephone number format complies with e.164 aliasing.

10. The system of claim 7, wherein the number having a standard telephone number format comprises a ten digit number proceeded by a 1.

11. The system of claim 7, further comprising:
    a switch associated with the second videoconferencing network,
    wherein the first gatekeeper forms a connection with the gateway,
    the gateway identifies the switch based on information transmitted from the gatekeeper,
    the gateway establishes a connection with the switch,
    the switch identifies the second network endpoint based on data received from the gateway,
    the switch establishes a connection with the second network endpoint, and
    the first network endpoint and the second network endpoint transfer videoconferencing data through the established connections.

12. A system comprising:
    an IP-based videoconference network comprising a first network endpoint and a gatekeeper,
    a second videoconference network comprising a second network endpoint,
    wherein the IP based network and the second network are connectable by a gateway,
    a videoconference between the IP based network endpoint and the second network endpoint is initiated by inputting, at the first endpoint, an identifier that is recognizable by a public switched telephone network as being associated with the second endpoint, and
    the gatekeeper determines a prefix corresponding to the identifier by consulting a call forwarding table, adds the prefix to the identifier, and identifies the gateway based on the prefix.

13. The system of claim 12, wherein the identifier is a ten digit number.

14. A method comprising:
    establishing a videoconference between an IP-based videoconference network comprising a first network endpoint and a second videoconference network comprising a second network endpoint,
    wherein the first network and the second network are connectable by a gateway,
    the videoconference between the first network endpoint and the second network endpoint is established by inputting, at the first endpoint, an identifier that is recognizable by a public switched telephone network as being associated with the second endpoint, and
    a gatekeeper of the IP-based videoconference network determines a prefix corresponding to the identifier by consulting a call forwarding table, adds the prefix to the identifier, and identifies the gateway based on the prefix.

15. A method for establishing a videoconference between a first network endpoint and a second network endpoint, comprising:
    inputting a plurality of numbers into the first network endpoint, wherein,
        the first network endpoint and the second network endpoint are each IP based network endpoints,
        the plurality of numbers are in a standard telephone number format, and
        the plurality of numbers are associated with the second network endpoint, communicating the input numbers to a first network gatekeeper having a call forwarding table, determining a prefix corresponding to a portion of the plurality of numbers using the call forwarding table, adding the prefix to the plurality of numbers, communicating the plurality of numbers to a parent gatekeeper, identifying the second gatekeeper based on the prefix, establishing a connection with the second gatekeeper, identifying the second network endpoint based on the plurality of numbers, establishing a connection between the second network gatekeeper and the second network endpoint, and transferring videoconferencing data between the first network endpoint and the second network endpoint through the established connections.

* * * * *